(No Model.) 4 Sheets—Sheet 1.

P. G. RUSSELL.
METER FOR ELECTRIC CIRCUITS.

No. 291,405. Patented Jan. 1, 1884.

WITNESSES
Jas. E. Hutchinson.
Henry C. Hazard.

INVENTOR
Philip G. Russell
by Prindle and Russell
attorneys.

(No Model.) 4 Sheets—Sheet 2.

P. G. RUSSELL.
METER FOR ELECTRIC CIRCUITS.

No. 291,405. Patented Jan. 1, 1884.

WITNESSES.
Jas. E. Hutchinson.
Henry C. Hazard.

INVENTOR.
Philip G. Russell.
by Prindle and Russell
Attorneys

(No Model.) 4 Sheets—Sheet 3.

P. G. RUSSELL.
METER FOR ELECTRIC CIRCUITS.

No. 291,405. Patented Jan. 1, 1884.

WITNESSES
Jas. E. Hutchinson.
Henry C. Hazard.

INVENTOR
Philip G. Russell
by Priddle & Russell
Attorney

(No Model.) 4 Sheets—Sheet 4.

P. G. RUSSELL.
METER FOR ELECTRIC CIRCUITS.

No. 291,405. Patented Jan. 1, 1884.

WITNESSES
Jas. E. Hutchinson
Henry C. Hazard

INVENTOR
Philip G. Russell
by Prindle and Russell
Attorneys

UNITED STATES PATENT OFFICE.

PHILIP G. RUSSELL, OF WASHINGTON, DISTRICT OF COLUMBIA.

METER FOR ELECTRIC CIRCUITS.

SPECIFICATION forming part of Letters Patent No. 291,405, dated January 1, 1884.

Application filed July 3, 1883. (No model.)

*To all whom it may concern:*

Be it known that I, PHILIP G. RUSSELL, of Washington, in the District of Columbia, have invented certain new and useful Improvements in Meters for Electric Circuits; and I do hereby declare that the following is a full, clear, and exact description thereof, reference being had to the accompanying drawings, in which—

Fig. 3, a side elevation of the meter with the cover raised and with the switch and clutch-shaft broken away below the switch-disk; Fig. $3^a$, a sectional view of the top plate of the resistance-box on line $y\ y$ of Fig. 3; Figs. $3^b$ and $3^c$, detail views of modified forms of resistance; Fig. 10, an enlarged detail view in elevation of the combined switch and clutch mechanism; Fig. 11, an enlarged plan view of the switch-disk with its contact-springs, and Fig. 12 a similar view of the cam-disk for controlling the clutch mechanism.

The object of my invention is to provide an improved meter for measuring and registering the length of time during which an electric current is allowed to pass over an electric light, telephone, or other circuit; and to this end it consists in the switch connected with the winding-arbor of the time mechanism, so that the movement of the switch to turn on the current winds up the clock mechanism; in the switch adapted to wind up the spring of the time mechanism, in combination with means for preventing overwinding; in the means provided for connecting and disconnecting the switch-shaft from the winding-gearing; in the winding-gearing and connections between the same and the switch-shaft and winding-arbor; in the means for preventing the use of the circuit beyond the time for which the time mechanism is adapted to run; in the means for turning the current back over the main line when a break occurs in the meter-circuit or undue resistance is interposed therein; in the peculiar stop device whereby the time mechanism is so stopped as to be always sure of starting again when the stop device is thrown out of action by the passage of an electric current over the circuit to which the meter is applied, and in the combination, construction, and arrangement of parts and devices, as hereinafter described, and more specifically set forth in the claims.

Figure 2:
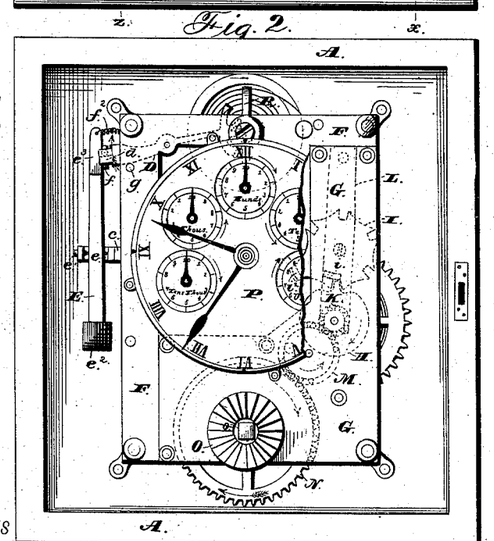
Fig. 2, a similar view of the same with the cover and the mechanism and devices attached thereto removed, and with a portion of the dial-plate broken away and the clock mechanism represented as fully wound up; Fig. $2^a$, a detail view of the engaging ends of the stop and escapement levers.
Figure 2A:
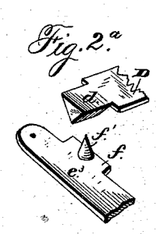
Figure 5:
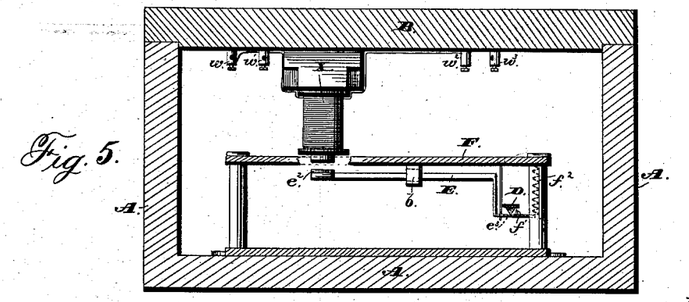
Fig. 5, a sectional view on line $z\ z$ of Fig. 1.
Figure 6:
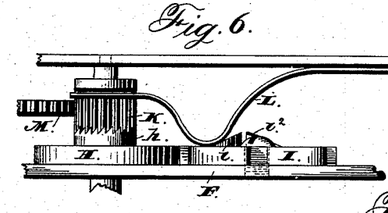
Fig. 6, a detail view in side elevation of the safety mechanism to prevent overwinding of the clock-spring.
Figure 7:
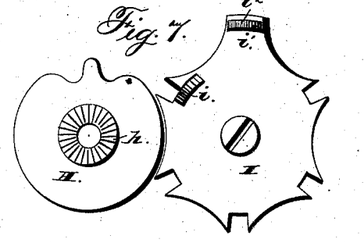
Fig. 7, a detail plan view of gearing used in the safety mechanism shown in Fig. 6.

In the drawings, A designates the casing of my meter, provided with a hinged cover, B, and suitable locking devices therefor. Within the casing, and firmly fastened to the bottom thereof, is the clock-movement C of the ordinary lever-escapement form. The escape-lever D extends beyond the side of the movement-frame, and is reduced in breadth at its outer end. This reduced portion $d$ is V-shaped in cross-section, and is made thicker than the rest of the lever, so as to extend below its lower surface, as shown best in Figs. $2^a$ and 5. At the side of the upper plate of the movement-frame is the short downwardly-extending lug $b$, to which is attached the bearing-piece $c$ for the lever E. The pivot-pin $e$ of this lever is journaled on the inner side directly in the upright portion, by which the bearing-piece is attached to the lug. The other end is journaled in the end of the screw $e'$, carried by the outer vertical portion of the bearing. By means of this screw any wear of the pivot-pin in its journal-bearing can be taken up, and the removal or putting in place of the lever is made easy. The lever is made of brass, wood, or such other non-magnetic material as is desired. At one end it carries the iron armature $e^2$ for the electro-magnet, to be hereinafter described. Near its outer end it is bent downward, and then outward again in a horizontal plane below that of the escape-lever. This low portion $e^3$ is provided with a side extension, $f$, which carries a conical pin, $f'$, so situated that its point comes under the reduced portion $d$ of the escape-lever, and is in a vertical line with the central point of the arc of movement of said lever. A spiral spring, $f^2$, is attached at one end to the end of the lever E, and at the other to the top plate, F, of the movement-frame. This spring serves to raise the end of the lever and bring the conical pin $f'$ into contact with the V-shaped under side of the escape-lever when the armature $e^2$ is not attracted by the magnet, as shown in Figs. 2 and 5. Instead of the spring to bring up the engaging end of the stop-lever, the other end may be made heavier, or the weight of the armature thereon can be so increased as to be relied upon to accomplish the same object. A stop-pin, $g$, extends downward from the plate F, to prevent too great throw of the escape-lever in one direction, while the supporting-post between the frame-plates limits the possible movement thereof in the other. Upon and above the top plate, F, is supported by suitable posts the bridge-plate G. The ordinary winding spring-arbor is extended upward and journaled at its upper end in plate G. Upon the arbor, just above plate F, is fastened the single-toothed wheel H, formed with a sleeve or hub, $h$, surrounding the arbor, and provided on its upper surface with clutch-teeth. Gearing with this single-toothed wheel is another wheel, I, in general appearance like a Geneva stop-wheel. (See Fig. 7.) It is journaled on a short stud screwed into the top-plate. This wheel I is provided with five recesses for the reception of and engagement with the single tooth on wheel H, so that the latter can turn through four full revolutions. The number of these notches or recesses can be increased or decreased if more or less turns of the spring-arbor are needed to wind up the spring.

Upon the wheel I is a cam, $i$, so situated as to be brought by the revolution of the wheel during the process of winding up the spring toward and into a line between the axes of the two wheels just as the desired limit of the winding is nearly reached, as shown in Fig. 2 in dotted lines. A projecting portion, $i'$, of the wheel carries a second cam, $i^2$, for a purpose hereinafter described. The spring-arbor is somewhat reduced in size above the wheel H, and upon this reduced portion slides and turns freely the pinion K, having clutch-teeth upon its lower face to engage those on the hub of wheel H. This pinion is normally kept down, with its clutch-teeth engaging those on the hub $h$, by the spring-arm L, attached at one end to the bridge-plate, and formed at the other with the usual and well-known form of clutch-fork entering and engaging the annular groove in the pinion in the usual manner. The spring for a portion of its length is bent downward, so as to nearly touch the wheel I, and be in the track of the cam $i$, so as to be struck and raised thereby as the said cam is brought by the revolution of the wheel into a line between the axes of wheels H and I. As the spring is raised, the pinion K will be forced up, so that its clutch-teeth are carried out of engagement with those on the hub $h$, and the pinion can turn freely on the spring-arbor. On account of the position of the cam $i$ upon the wheel I, as described above, this raising of the spring-arm L, and consequent unclutching of the pinion and hub, takes place just as the limit of winding of the spring is neared.

Upon arbors $m$ and $n$, journaled in the top plate, F, and bridge G are the gear-wheel M, meshing with pinion K, and the large toothed wheel N, gearing with wheel M. The pinion K is made long, so that it can have considerable up-and-down movement upon the spring-arbor, while its teeth remain always in mesh with those on gear-wheel M. The wheel N and pinion K are of such relative size and number of teeth that one-half turn of the former will cause the latter to revolve four times. The clutch-teeth upon pinion K and the hub $h$ are so formed as to interlock and be operative when the pinion is down, and is caused to turn in the direction indicated by the arrow in Fig. 2. The revolution of the large wheel N in the direction also indicated in the same figure by an arrow will, through the intervention of gear M, cause pinion K to so turn, and will consequently cause the spring-arbor to be revolved to wind up the spring. The arbor $m$ is extended up through the bridge-plate, and has fixed upon its squared upper end, and just above the bridge, the clutch-disk O, formed with the upwardly-extending hub $o$.

Supported upon the top plate, F, and bridge G by the ordinary form of supporting-posts is the dial-plate P. The dial-plate can be made square, and the supporting-posts arranged accordingly, so as to support the plate at its corners; or a circular dial-casing be provided with suitable lugs or projecting portions, to receive the upper ends of the posts, as shown in Fig. 2.

Figure 1:
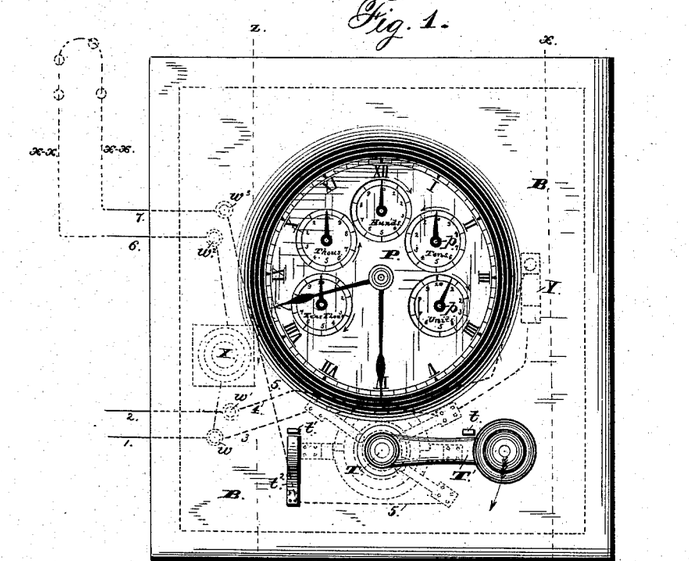
Figure 1 shows a plan view of my meter with the cover down.
Figure 4:
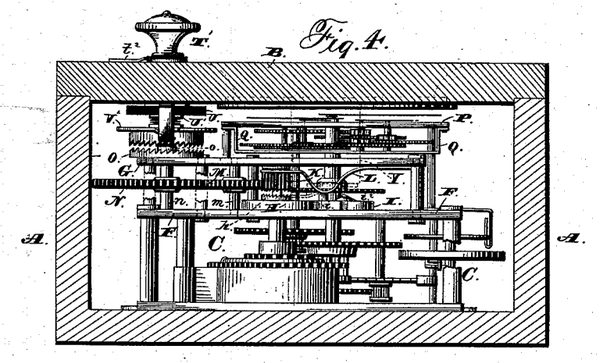
Fig. 4, a view of a vertical section of my meter on line $x\ x$ of Fig. 1, with the stop-lever, magnet, binding-posts, contact-springs, and wires left out for sake of clearness, and with the switch-arm turned to the limit of its movement in the direction indicated by the arrow in that figure; Figs. $4^a$ and $4^b$, respectively, detail views in plan and elevation of the register-gearing.
Figure 4A:
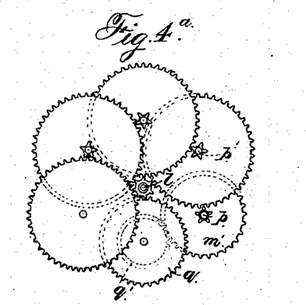
Figure 4B:
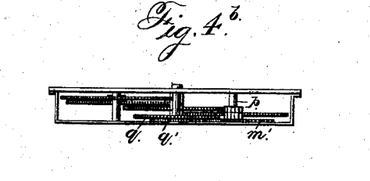

The usual minute and hour hand arbors are somewhat extended, as shown in Fig. 4, to bring the hands above the dial-plate, which is provided with the ordinary form of clock-dial and with several small register-dials arranged within the circle of the graduations of the large dial, as shown in Figs. 1 and 2. These small dials are each graduated into ten equal divisions. Each of the single hands moving over its respective dial is attached to the end of an arbor journaled near its upper end in the dial-plate, and at its lower end in the bridge-piece Q, attached to the under side of the dial-plate. Upon the hour-hand sleeve or arbor is fastened a small gear-wheel, $l$, having, preferably, seven teeth. This wheel gears with a wheel, $q$, which has thirty-five teeth. Attached to the arbor of this wheel, which is journaled in dial-plate and bridge, as the arbors of the index-hands, is a pinion, $q'$, having fifteen teeth, which gears with the thirty-toothed wheel $m'$ on the first index-arbor, $p$. This arbor will evidently, then, make one complete revolution for ten turns of the hour-arbor. The index-hand on this arbor will therefore indicate on its dial up to ten the number of turns of the hour-hand through its circuit of twelve hours. Upon the arbor $p$, above the wheel $m'$, is a small five-toothed pinion gearing with a large fifty-toothed gear-wheel on the second arbor, $p'$, which carries the index-hand over the second small dial. The second pointer will then make one complete revolution for ten turns of the arbor of the first dial. This arrangement upon the arbors of gears and pinions, bearing the relation to each other in size and number of ten to one, is continued throughout the register-gearing, as shown in Fig. 4ª, so that with the five dials shown the number of turns of the hour-hand through the circuit of twelve hours can be registered up to one hundred thousand. The minute and hour hands will of course indicate on the large dial any fraction that there may be of time over and above what is shown on the small register-dials. The number of these dials can evidently be increased or diminished, as desired, the only limit to increase in number being the size of the dial-plate.

The large wheels on the arbors of the second, third, fourth, and fifth index-arbors are, as shown, on planes above the upper face of the pinion on the hour-arbor, so that they can overlay this pinion slightly without gearing therewith. (See Figs. 4ª and 4ᵇ.) Any other of the well-known arrangements and constructions of registering-gearing in use in meters of all kinds can be used as desired; but I prefer the kind shown and described as acting best in connection with the time mechanism. It can be constructed to turn most easily and with the least friction, and acts more steadily than the common form of register-gearing, where a single-toothed pinion gears intermittingly with the gear-wheel on the succeeding index-arbor.

The clock-movement is provided with the ordinary form of regulator for the balance-spring. The regulator-arm R is shown as projecting beyond the movement, and can, if desired, be provided with a graduated scale along the edge of a semicircular projecting portion of the top plate, and concentric with the arc of travel of the end of the arm.

Figures 3, 3A, 3B, 3C:
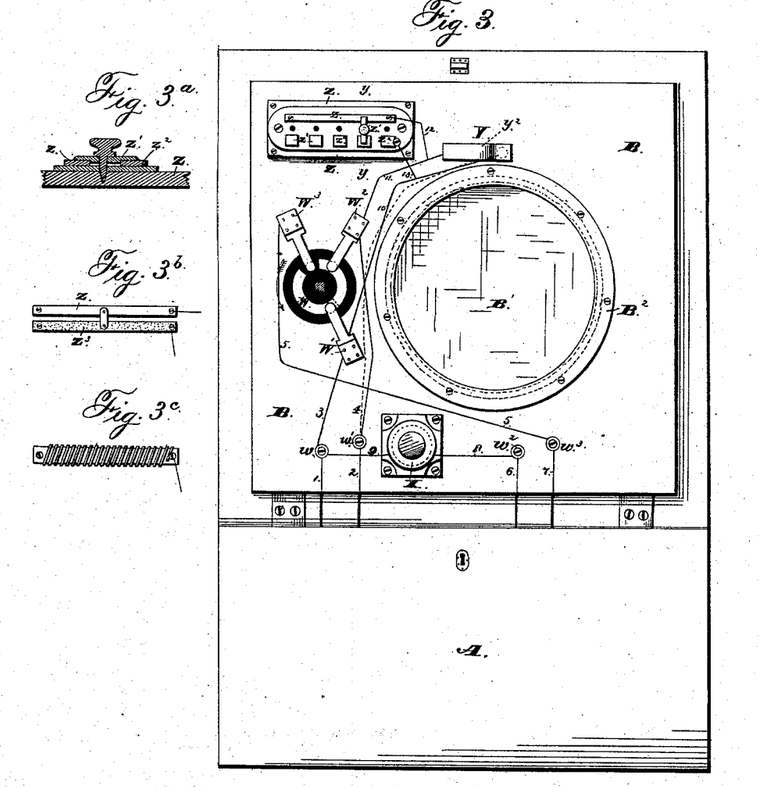

The cover B is, as stated above, hinged to the main part of the case at one side, and is provided on the other with a hasp, as shown in Fig. 3, to act in conjunction with any desired form of lock set in the casing. The under side of the cover is reduced in thickness around its edges, the width of the reduced portion corresponding closely with that of the sides of the casing, so that the square edges of the thick portion of the cover will rest against the inner faces of the sides when the cover is down. As the thicker or main portion of the cover projects down below the upper edges of the sides and fits so closely within the casing, the cover will be firmly held in place. With such construction the mechanism contained within the case evidently cannot be tampered with by means of a wire or small instrument between the cover and the upper edges of the casing-sides. In place of the construction shown and just described, the same ends could be gained by making the cover of the same thickness throughout, and providing it with a flange of metal or other material just fitting within the sides of the casing and projecting some ways below the upper edges thereof. The cover is provided with a large circular opening to display the dials below. This opening is closed on the under side of the cover by a disk of glass, B'. This disk is larger than the opening and overlaps the edge thereof, which is cut away all around to allow the disk to be set into the cover, so as to be flush with its under face. (See Fig. 9.) The glass is held firmly in place by means of a flat metal ring, B², overlapping its edge all around, and fastened to the cover by screws.

Figures 10, 11, 12:
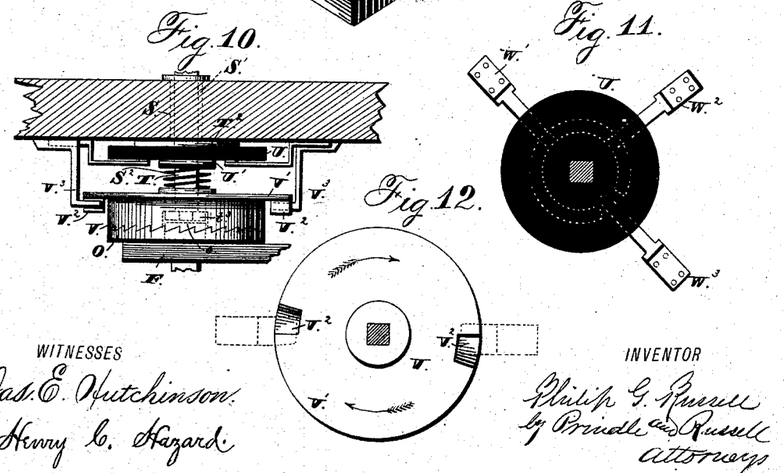

Through the cover, and so situated as to be vertically above the arbor $m$ and the center of clutch-disk O, is an opening, S, provided with a metallic bushing, S', with a flat flange overlapping the upper edge of the opening, as shown in Fig. 10. In this bushing is journaled the switch-shaft T, to the upper end of which is fastened, in any desired way, the switch-arm T', provided at its outer end with a knob or handle, preferably of some non-conductive material. Two stop-pins, $t$ and $t'$, are fixed in the cover, so as to limit the movement of the switch lever or arm in either direction. Upon the cover, near the pin $t'$, is placed a catch spring, $t^2$, with its free end close to the pin normally standing up from the cover. Near its middle the spring is bent upward or provided with a rounded projection, over which the switch-arm can ride when it is swung around to and against the stop-pin $t'$ and back again to its first position. The spring will, because of its upward pressure, serve to hold the switch-lever in place when the hand is removed. A straight spring could be provided strong enough to hold the lever in place by friction; but the rounded projection or upward bend, as shown in Fig. 4, makes the holding more secure.

Upon the shaft just below the cover, and bearing against the lower end of the bushing and the face of the cover, is a collar or flange, T², made fast to the shaft. The shaft is squared below this collar, and upon it is fitted and fastened the ebonite or hard-wood disk U, close up against said collar; also, upon the shaft, and bearing against the lower face of the disk, is the collar U'. A strong spiral spring, S², surrounding the shaft, bears at its upper end against collar U' and at its lower upon the clutch-disk V. The opening in this disk, through which the squared portion of shaft T passes, is squared to accurately fit thereon, so that the disk can slide easily up and down on the shaft, but must turn with it. The lower end of the shaft is reduced in size, and screw-threaded to receive the screw-nut $t^3$, whose edge overlaps the lower end of the main portion of the shaft. The lower side of the disk V is provided with a central circular recess large enough to admit this nut. The downward movement of the disk under stress of the spring S² is limited by the contact of the bottom of this recess with the nut or collar, as indicated in dotted lines in Fig. 10. Said recess is deep enough to allow the clutch-disk to be forced down, so that its clutch-face is below the end of the shaft. The hub $o$ of the disk O fits in and extends up into the recess, so as to almost be in contact with the end of the shaft T when the cover is down, as shown in Fig. 10. When the disk V is free to move on the shaft, it is forced by spring S² downward, as shown in the figure just referred to, so that its clutch-teeth engage those on the disk O. These teeth are so constructed as to be operative only when the switch-arm is being turned in the direction indicated by the arrow in Fig. 1. When the arm and its shaft are turned backward, the disk V will yield and rise on the switch-shaft, and its teeth will ride up over those on disk O, as in the usual form of backing ratchet-clutch. The clutch-pinion K can also act in the same way in connection with the clutch-hub $h$. The disk V is formed around its upper edge with a flange, V', which at points diametrically opposite each other has downwardly-turned portions V², forming cams.

Attached to the under side of the cover are the lugs V³ V³, extending down close to the edge of the flange and then bent at right angles, so as to pass thereunder close to the lower face of the flange. These lugs are also placed with relation to the disk diametrically opposite each other. The lugs and the cam-tongues on the flange are so relatively situated that when the switch-arm is in the position shown in Fig. 1 the ends of the lugs will be over the upper faces of the lower ends of the tongues, and one edge of each lug will bear against the inclined upper face of its respective tongue. The action of the lug ends and these cam-tongues will then be to aid somewhat the spring S² in bringing the clutch-teeth on disk V into positive and certain engagement with those on disk O, so as to be operative therewith when the switch-arm is turned from its position in the direction indicated. The tongues, as shown, incline downward in a direction opposite to that in which the disk V now turns. When it is turned nearly one-half around, the lower inclined faces of the cam-tongues come into contact with the lugs and ride up thereon, so that the clutch-disk V will be raised and the clutch-teeth of the two disks disengaged just before the switch-arm has reached the limit of its motion. By this movement of the switch-arm and shaft the gear-wheel N has, through the medium of the clutch-disks, been caused to turn about one-half around in the direction indicated by the arrow in Fig. 2. As described above, such turning of this wheel winds up the clock-spring. The unclutching of the disks is necessary to leave the clock mechanism free to run when it is started, as hereinafter set forth. If the teeth of the disks should remain in engagement with one another, the winding-gearing would be locked and prevented from being turned backward by the necessary retrograde rotation of the spring winding-arbor while the time mechanism is running. Without disengagement of the clutch-disks, therefore, the operation of the time mechanism would be impossible. The cams and lugs are so arranged with relation to each other that this disengagement of the disks takes place just before the current is turned through the working-circuit by the devices and in the manner hereinafter set forth. The two cams diametrically opposite each other, acting in combination with the lugs situated as described and shown, operate upon both sides of the disk V equally and at the same time, so that it is slid upon the squared shaft T easily without binding, and with the least friction thereon.

The disk U, of ebonite or non-conducting material, has set into its lower face, so as to be flush therewith, the metal strip W. This is preferably of platinum or brass, and has the form of a broken ring concentric with the disk.

Attached to the under side of the cover are the three metallic contact-springs W' W² W³. They are arranged around the disk, as shown, and extend beneath it and toward its center. Their ends press upon the lower face of the disk in the track of the metal strip W as the disk is rotated by means of the switch-arm. As shown in Figs. 1, 3, 9, and 11, the broken part of the strip is so situated on the disk that when the switch-handle is as represented in Fig. 1 the end of spring W³ will rest upon the portion of the non-conducting material of the disk which intervenes between the two ends of the strip. The springs W' and W² then bear upon the strip. The springs W' and W³ are with relation to the disk diametrically opposite each other. When, then, the switch-arm is turned to the limit of its movement in the direction indicated by the arrow in Fig. 1, and the disk is consequently turned through a half-revolution, the spring W' will bear upon the disk between the ends of the strip, as W³ did before. The spring W² evidently is always in contact with said strip.

Figure 9:
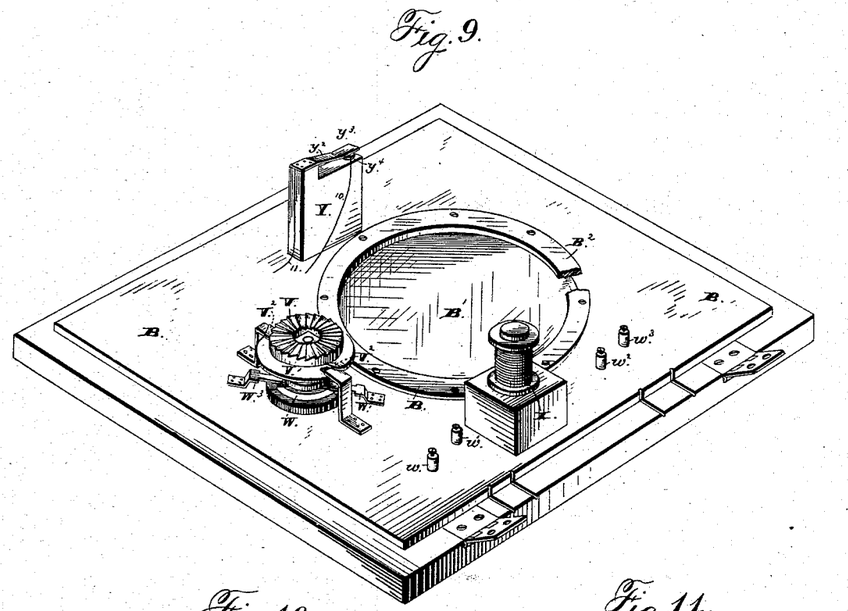
Fig. 9, a perspective view of the cover with its attachments turned over without the wires.

Upon the inside of the cover, near the hinge side of the same, are the binding-posts $w$, $w'$, $w^2$, and $w^3$, of ordinary form. The two main-line wires 1 and 2 pass in under the edge of the cover in grooves prepared for them, as shown in Figs. 3 and 9, and their ends are made fast in the binding-posts $w$ and $w'$, respectively. The former post is connected with contact-spring W' by wire 3, and the latter post with spring $W^2$ by wire 4. Contact-spring $W^3$ is connected with binding-post $w^3$ by wire 5. The wires 6 and 7 of the working-circuit, the time of whose using is to be measured, pass in under the edge of the cover in grooves provided therefor, just as the wires 1 and 2 do, and their ends are made fast in the binding-posts $w^2$ and $w^3$.

Figure 8:
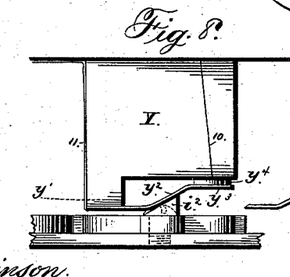
Fig. 8, a detail view in elevation of the device for automatically turning off the current from the circuit when the registering-clock is allowed to run down; Fig. $8^a$, a similar view of another form of device for the same purpose, to be used instead thereof when desired, as hereinafter described.

Upon a block fastened to the cover about on a line with the several binding-posts is a small electro-magnet, X, which, as shown in Fig. 5, extends downward, so as to be just over and near enough to the iron armature $e^2$ on stop-lever E, to attract the same and draw it upward when an electric current passes through the magnet-coil. The binding-post $w^2$ is connected by wire 8 with one end of the wire forming the coil, and the binding-post $w$ by wire 9 with the other end thereof; also, attached to the cover near the edge of the opening therein is the block Y, which, when the cover is down in place, extends down close beside the bridge G on the movement-frame. Its lower end, as shown best in Fig. 8, has a downward extension, $y'$, which reaches nearly to the plane of the upper face of cam-wheel I. (See dotted lines of Fig. 4.) To the lower end of this extension is attached the thin metallic contact-spring $y^2$, formed, as shown, with the horizontal attaching portion, the upwardly-inclined part, and the horizontal end $y^3$, which comes just under the metal contact-piece $y^4$, but normally stands out of contact therewith. The inclined portion of the spring is so situated as to be in the track of the cam $i^2$ on the projecting arm $i'$ of wheel I, as said wheel is turned back by the action of the single-toothed wheel on the winding-spring arbor as the clock runs down. With my construction of wheel I and single-toothed wheel on the arbor, when the clock has been wound up, as represented in Fig. 2, four backward revolutions of the spring-arbor as the clock mechanism runs down will bring the cam $i^2$ into contact with the inclined portion of spring $y^2$, so as force the end $y^3$ of the same up into contact with contact button or piece $y^4$, as shown in Fig. 8. Wires 10 and 11 connect contact-springs W' and $W^2$ with metal piece $y^4$ and spring $y^2$, respectively.

Figure 8A:
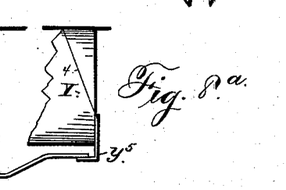

In Fig. $8^a$ is shown a modification of the arrangement of contact devices on block Y. In this modification the end of the spring is normally down in contact with the inturned end of the metal lug $y^5$, and is lifted up therefrom by the action of the cam $i^2$ against the inclined portion of the spring. This modification is to be used, instead of the other form, for certain purposes, as will be hereinafter set forth.

Z designates a box or casing containing any well-known form of resistance device, as desired. The brass bar $z$, bridge or key $z'$, and contact plates or buttons $z^2$, suitably connected with the resistance coils or pieces within the casing, furnish ready means for regulating in the well-known way the amount of resistance applied. With the binding-screws of the resistance-box are connected the branch wires 12 and 13 from wires 11 and 10, respectively. (See Fig. 3.) As I intend to make no claim to any particular form thereof, it is not necessary to describe further the resistance devices. Where great resistance is necessary to obtain the result desired, as hereinafter set forth, and there is not room within the meter-casing for the devices therefor, the box containing them may be placed outside of the meter and joined to the main line-wires by branches from the same without departing from the spirit of my invention. Where less resistance is needed, a metal bar, $z$, and a carbon-bar, $z^3$, with a connecting metallic bridge-piece, as shown in Fig. $3^b$, can be used, the branch wires being connected therewith as shown. This carbon bar or rod is preferably to be made of gas-coke, as offering great resistance. A movable bridge-key like that shown in Fig. 3 can be used to connect the two bars.

In Fig. $3^c$ is represented another form of resistance device. This consists of a wooden bar, around which is coiled a wire or small rod of some metal alloy, or other material possessing high resistant power. This bar is to be placed parallel with a brass rod like the bar $z$, and a key-bridge like $z'$ is to be used to bear upon and connect the two. The material of the meter-casing and the relative sizes of the gears for winding or for registering can be changed, as desired, without departure from the spirit of my invention. The clock-movement can of course be of the thirty-hour or eight-day kind, as is found most desirable to subserve any particular purpose.

The operation of parts and devices forming my meter is as follows: When the switch-lever arm is in the position shown in Fig. 1, the clutch-disk on its shaft is down in engagement with the corresponding clutch-disk. As shown in dotted lines, the contact-springs W' and $W^2$ bear upon the conducting metal strip W, while the spring $W^3$ bears upon the nonconducting disk between the ends of the strip. The circuit over which the current passes from the main line will then evidently be formed of wires 1 and 3, contact-spring W', strip W, spring $W^2$, and wires 4 and 2. The current then does not pass over the working-circuit. As the electro-magnet coil is also outside of the circuit through which the current now passes, the armature on the stop-lever will not be attracted and raised; but the other end of said lever will be by the spring $f^2$ pulled and held up so that its pin $f'$ engages the wedge-shaped under side of the end of the escape-lever. As this pin is so situated that its point is in a vertical line below the middle point of the arc of travel of the end of the escape-lever, it will, by engaging with the inclined sides of the wedge, force and keep the lever to one side of its dead-center or center of motion, as shown in Fig. 2, so that the balance-spring will be put under sufficient stress to make the starting of the clock-movement certain when the engaging end of the stop-lever, with its pin, is drawn down. The lower edge of the V-shaped end of the escape-lever is sharp, as is also the point of the pin, to insure that the lever shall not be stopped at the middle point of its stroke by chance direct contact of the pin with the under side of said lever, but shall always be by the action of the stop-lever forced to one side or the other of such middle point. When, then, the switch-arm is as represented in Fig. 1, the current does not pass over the working or meter circuit, and the clock is stopped, but ready to start automatically upon releasing of the escape-lever. If, now, the switch-arm be turned in the direction indicated by the arrow in Fig. 1, the clock-spring will, through the action of the clutch-disk's gearing and clutch-pinion, be wound up, as described above. If the spring is already nearly wound, so that the desired limit of the winding is reached before the switch-arm reaches the end of its throw, the cam $i$ on the cam-wheel is brought under the spring and lifts the same up, so as to throw the clutch-pinion up on the spring winding-arbor, so that its clutch-teeth no longer engage those on the hub of the wheel H. The winding of the spring will therefore be stopped, and the switch-arm can move on through the rest of its throw without any danger of injury to the clock by overwinding. This unclutching of the winding-gearing from the clutch-hub on the spring winding-arbor can be made to take place at any desired point of the winding by a suitable placing of the cam $i$ on the stop-wheel I, which, as set forth above, is turned back and forth by the rotation of the single-toothed wheel H fast on the arbor. The stop-wheel, with its five notches, as shown, is adapted, when the clock has nearly run down, to allow of four full turns of this arbor to wind up the spring before the cam $i$ comes around under the clutch-operating spring-arm L. When the switch-arm has nearly reached the limiting stop-pin, the cam-tongues $V^2$ on the clutch-disk strike and ride up on the lugs $V^3$, so that said clutch-disk is slid up on the switch-shaft out of engagement with the clutch-disk O. This unclutching leaves the winding-gear free to turn back with the backward revolution of the winding-arbor and clutch-pinion after the cam $i$ on wheel has passed out from under the clutch-spring arm. When the switch-arm reaches the stop-pin, the disk U will have been turned one-half around, so that the non-conducting portion of the disk between the ends of strip W is rested upon by the end of contact-spring W', while springs $W^2$ and $W^3$ bear upon the strip. The current is then no longer short-circuited, as set forth above. The circuit over which it passes now consists of wires 2 and 4, contact-spring $W^2$, strip W, contact-spring $W^3$, wires 5 and 7, working-circuit $x\,x$, wires 6 and 8, coil of electro-magnet X, and wires 9 and 1. As soon as the current begins to pass through this circuit the magnet attracts the armature on the end of the stop-lever, so that the other end of the lever is thrown down, and the pin thereon is disengaged from the end of the escape-lever. Owing to the action of the pin and V-shaped end of the latter lever, as set forth above, the balance-spring is kept under stress while they are in engagement with one another, so that the clock mechanism will automatically be thrown into full action upon the lowering of the engaging end of the stop-lever by the attraction of the magnet exerted upon the armature, as set forth. The clock mechanism will now continue in action to measure and register time as long as the current continues to pass over the working-circuit. If any break in the circuit or short-circuiting takes place in the line for any reason, the clock is automatically stopped by the stop-lever, the armature upon which is no longer attracted by the magnet. I arrange for automatically short-circuiting the current from the working-circuit, to prevent the consumer from using the latter circuit long enough to let the clock run down, and then using it without registration of the time of such further use. To prevent any such fraud, the cam $i^2$ on the arm of cam-wheel I is adapted to come under the light contact-spring $y^2$ on block Y when the clock has nearly run down and lift the same, so that its free end comes into contact with the metal button $y^4$. This spring is connected with contact-spring $W^2$ by wire 11, and the button with contact-spring W' by wire 10. When, then, the spring $y^2$ is lifted, as described, into contact with the button $y^4$, the electric current from the main line will be short-circuited, passing through wires 1 and 3, rear end plate of contact-spring W', wire 10, metal button $y^4$, spring $y^2$, wire 11, rear end plate of contact-spring $W^2$, and wires 4 and 2. It will then be turned off from the working-circuit, and the clock mechanism will be stopped until the switch-arm be turned back to or toward the first position occupied in Fig. 1, and then forward again, so as to wind up the clock. Except in case of intended fraud, this guard mechanism will usually not be called into play. Ordinarily, the customer will not keep his light or lights burning, or use the circuit more than thirty hours at a time. Where the circuit is to be used more than such a length of time at one stretch, an eight-day clock mechanism could be used, instead of the thirty-hour kind, without material change in the essential features of my invention. The thirty-hour movement could still, however, be used to advantage, for only one movement of the switch-lever, as described above, would be sufficient to keep the meter in action thirty hours.

The resistance device shown in Fig. 3 is to be so adjusted as to offer more resistance to the passage of the electric current than the working-circuit normally does. No appreciable current then will pass through any portion of said resistance device while the circuit is in its normal condition. If, however, a break should occur in said circuit, the current will not be cut off or interrupted on the main line, but will pass through the branch wires 12 and 13 and the resistance-coils or other devices in the box Z. If the consumer should attempt to interpose in the working-circuit extra lamps or motors in series, or to use more of the power of the current than he was entitled to, or the meter was set for by the adjustment of the resistance device, the resistance offered by the circuit will exceed that of the said resistance device, and the current will of course pass through the latter back over the main line, and not over the working-circuit.

The box containing the resistance coils or bars can be made to extend down to the bottom of the casing when the cover is down, and can also be made wider. As hereinbefore indicated, it can, where great resistance is wanted, be made of any desired size, and placed outside of the meter-casing, with branch wires connecting its binding posts or screws directly with the wires of the main line.

As the resistance device is not normally included in the circuit, but is only connected therewith by branch wires, it evidently can be omitted entirely, when desired, without modifying or interfering with the action of the other parts of the meter.

When the circuit for which the meter is employed is the only one to be supplied from the source of the electric current, a modified form of switch and contact device on block Y is to be used. This is the case, for instance, where the meter is used in connection with a secondary or storage battery to measure the time during which a current therefrom is used. Here it is desirable that when not in use the current should be cut off and stopped entirely, and not merely short-circuited back over the main line, as described above, where a number of circuits are supplied from one source. To adapt the meter for use in such a case, the resistance device, contact-spring W', and wires 3 and 10 are omitted. The wire 4, instead of being connected directly with contact-spring W², is continued on past this spring, as shown in dotted lines in Fig. 3, and connected with the metal lug $y^5$ of the modified form of contact-piece on block Y, as shown in Fig. 8ª. As already described, the spring $y^2$ in this modified form normally is in contact with and presses upon the arm of the lug. The metal strip on the switch-disk is much shorter than that hereinbefore described. Its length and position are indicated by dotted lines in Fig. 3. All the other parts and wires besides those referred to remain the same. There is then no complete or closed circuit over which the current can pass until the switch is turned through a half-revolution, so that the short metal strip on the disk comes under the ends of the contact-springs W² and W³. If the clock be allowed to run down before another movement of the switch, the cam $i^2$ on wheel I will come against and force up the spring $y^2$, so that its end will be carried out of contact with the metal lug $y^5$. The circuit will evidently then be broken and the current stopped. By the action of the stop-lever, as set forth above, the clock mechanism will also be stopped at the same time.

My meter is adapted for use wherever it is desired to measure the time during which an electric current is allowed or caused to pass over a circuit. It can be used in connection with electric-light or telephone circuits, as well as with the circuits of systems for supplying electricity as a motive power.

When my meter is to be used with a telephone-circuit, the ordinary telephone-switch lever can be attached to the switch-shaft, and the switch-disk and clutch can be slightly modified to be operated by less than half a turn of the shaft, if desired.

My meter, as shown and described, does not use up any of the electro-motive force of the current to be measured, as is the case where the registering mechanism is driven by an electromotor, and, as it is not dependent in any way upon the electric current for the power to run it, it is not subject to the irregularities of running present and noticeable whenever an electromotor is employed to operate the register.

The magnet used for actuating the stop-lever is so small as to offer no appreciable resistance to the passage of the current, and to have no possible injurious effect upon the clock-movement.

With my arrangement of circuit none of the current can pass through any of the time mechanism to the injury thereof.

With my arrangement of clutch mechanism for connecting the switch-shaft with the winding-gearing it will be observed that until the switch-arm is moved over nearly to its limit of turn on the current it is impossible for the clock-movement to run, not only because of the action of the stop-lever, but because the clutch-disks, as long as they engage one another, lock and prevent the winding-gearing from the turning backward, which must take place while the time mechanism is running. There are, then, two safeguards against the accidental starting of the clock-movement before the electric current is turned on through the meter-circuit.

To sum up the advantages of my meter, as shown and described: It is not complicated in structure, and is so compact as to take up little room, its full size being shown in the drawings. It is cheap in construction, for the ordinary form of lever-escapement clock-movement is employed. As applied to a circuit, it does not appreciably increase the resistance of the circuit, and does not use any of the electro-motive force of the current to drive any of the registering mechanism. The time-movement is not rendered liable to injury by passage of the circuit through any of its parts, nor by the proximity of a powerful electro-magnet. Extra lights or motors, increasing the resistance of the circuit beyond the point for which the meter is set, cannot be placed in the working-circuit.

With my construction of meter and arrangement of circuit making and breaking devices it is impossible to use the working-circuit without the full time of such using being registered. The time-registering devices cannot begin to operate until the current is turned through the meter-circuit. Finally, the time mechanism is always kept wound up by the movement of the switch in turning on the current, and is certain to be started into full action as soon as the current begins to pass over the meter-circuit, and to be stopped immediately upon its stoppage.

I contemplate using, if desired, any of the well-known forms of regulator in connection with each meter to control the power of the current passing over the working-circuit. Ordinarily, however, such regulators can be dispensed with, and the usual automatic governor or regulator, acting directly in connection with the means or mechanism for generating the electric current, can be relied upon to maintain the strength of current over the main and working circuits at the desired point.

I do not herein claim the peculiar form of safety device for preventing overwinding as shown and described, except in combination with the switch and connecting winding mechanism, nor, broadly, the peculiar form of stop device, also shown and described, except in combination with the means for operating it, as I intend to cover such forms of devices in other applications to be shortly filed by me as divisions of this case.

Having thus fully set forth the nature of my invention, what I claim is—

1. In a meter for measuring the length of time of the passage of an electric current over a circuit, the combination of the switch, the winding-arbor of the registering-clock, and suitable connecting mechanism, all so arranged that the movement of the switch to turn the current through the circuit will wind up the clock, substantially as shown and described.

2. In combination with the winding-gear, the switch-shaft, the clutch mechanism connecting the two, and means for throwing said clutch mechanism out of operation near the end of the movement of the switch, and before the current is turned on through the circuit, substantially as and for the purpose described.

3. The switch, in combination with means whereby the spring of the time mechanism is wound up by the movement of the switch, and means for preventing overwinding of the spring, substantially as shown and described.

4. In combination with the spring winding-arbor, the switch-shaft, and suitable connecting-gearing, all so arranged that the movement of the switch to turn on the current winds up the spring, means for automatically disconnecting the gearing from the spring winding-arbor when the spring is wound up, substantially as and for the purpose shown and described.

5. The combination of the switch, the switch-shaft, the winding-gearing connected therewith and with the spring winding-arbor, means for disconnecting the switch-shaft from the winding-gearing when the switch-arm has nearly reached the limit of its movement, and means for disconnecting the winding-gearing from the arbor when the spring is wound up, substantially as and for the purpose set forth.

6. The combination of the switch-arm, the switch-shaft, the switch-disk fast thereon, the conducting-strip on the disk, the contact-springs and circuit-wires, the clutch mechanism connecting the shaft with the winding-gearing, and suitable means for disengaging this clutch mechanism near the end of the throw of the switch-arm, and just before, by the action of switch-disk and contact-springs, the current is turned through the meter-circuit, substantially as and for the purpose set forth.

7. In an electric meter, the combination of the switch, its shaft, and the backing-ratchet form of clutch connecting the shaft with the winding-gearing of the time-register, so that the switch-shaft can be turned back without turning the gearing, substantially as shown and described.

8. The combination of the switch, its shaft, the spring thereon, the clutch-disk sliding on the shaft, but turning therewith, and provided with diametrically-opposite cams, and the lugs acting in connection with the cams, and so relatively situated as to raise the clutch-disk out of engagement with the corresponding disk, fast on the arbor of the first wheel of the winding-gear, as the switch-arm approaches the limit of its throw, substantially as shown and described.

9. The combination of the switch-arm and switch-shaft, the clutch-disk sliding on the shaft, but turning therewith, and pressed down toward the end thereof by a spring, the flange on the disk, provided with diametrically-opposite cam-tongues, and the lugs acting in connection with the tongues to raise the disk up on the shaft against the stress of the spring, substantially as shown and described.

10. The combination of switch-arm T', switch-shaft T, disk U, conducting-strip W, contact-springs W' W² W³, clutch-disk V, flange V' thereon, cam-tongues V² on the flange, lugs V³ V³, spring S², clutch-disk O on the arbor of wheel N of the winding-gear, and suitable circuit and connecting wires, substantially as and for the purpose set forth.

11. The switch connected with and operating the winding-gearing, in combination with the single-toothed wheel and clutch-hub on the spring winding-arbor, the notched stop-wheel carrying a cam, the clutch-pinion sliding on the arbor and meshing with the winding-gearing, and the spring-arm adapted to normally press the pinion down into clutch with the hub, but to be struck by the cam and raised, so as to unclutch the pinion and hub when the spring has been sufficiently wound, substantially as shown and described.

12. The switch and connecting gearing, in combination with the wheel H and clutch-hub $h$, spring winding-arbor, grooved clutch-pinion K, sliding thereon, wheel I, cam $i$, and forked spring L, substantially as and for the purpose set forth.

13. The time-registering mechanism of the meter, in combination with means for automatically short-circuiting the current from the working back to the main circuit when the mechanism has nearly run down, substantially as set forth.

14. The combination of the toothed wheel on the winding-arbor, the stop-wheel gearing therewith, the cam on the stop-wheel, the contact-spring, the contact button or piece, and the connected wires, all so arranged that when the clock has nearly run down the cam is brought under the spring and forces it up against the contact-piece to short circuit the current from the working-circuit, substantially as and for the purpose described.

15. In combination with the winding-arbor, the wheel H, wheel I, cam $i^2$, spring $y^2$, contact-piece $y^4$, and wires 10 and 11, connected with the wires from the main line or circuit, substantially as and for the purpose set forth.

16. In combination with the mechanism for measuring the time during which the electric current passes over a working-circuit, means adapted to cause the current from the main line to flow over the working-circuit when said circuit is connected with the main line, and to allow it to flow from one main line wire to the other without passing over the working-circuit whenever undue resistance occurs in the latter, substantially as and for the purpose set forth.

17. In combination with the working-circuit, the meter adapted to measure the time of use of the working-circuit, and the resistance device suitably connected with the wires of the main or supply circuit and offering a resistance to the passage of the current greater than the normal resistance of the working-circuit, so that if any break occurs or any undue resistance is interposed in the working-circuit the current will not pass over said circuit, but from one main wire through the resistance device back to the other, substantially as set forth.

18. The combination of the time mechanism, a stop device adapted to arrest the movement of the escapement, so that the balance-spring shall always be put under stress when the stop device is in operation, means for holding said stop device in action, and means for throwing it out of action when an electric current passes over the circuit to which the meter is applied, substantially as and for the purpose set forth.

19. The combination of the balance or escape lever of the time registering mechanism, a stop device applied thereto and adapted, when in engagement therewith, to force and hold the lever away from its dead-center, and means for disengaging the stop device from the lever when the current passes over the circuit to which the meter is applied, substantially as set forth.

20. In combination with the time mechanism, the stop-lever adapted to engage the end of the escape-lever and force the same to either side of its dead-center, so as to stop the time mechanism and put the balance-spring under sufficient stress to make certain the starting of the movement when the levers are disengaged, and means for disengaging the stop-lever from the balance-lever when an electric current passes over the circuit to which the meter is applied, substantially as shown and described.

21. The combination of the escape-lever having a portion made V-shaped in cross-section with the armature-lever provided with a stop-pin adapted to engage said V-shaped portion of the escape-lever, and an electro-magnet to operate the armature-lever, substantially as and for the purpose set forth.

22. The combination of the balance or escape lever formed with the V-shaped portion, the stop-lever provided with a projection to engage such portion, and an armature, the spring, and the electro-magnet interposed in the meter-circuit, and adapted to attract the armature and disengage the projection and balance-lever when the current passes through the circuit, substantially as and for the purpose described.

23. The combination of the electro-magnet X, interposed in the meter-circuit, the lever E, armature $e^2$ thereon, conical pin $f'$, spring $f^2$, attached to the frame and end of the lever, and the balance or escape lever D, having portion $d$, V-shaped in cross-section, substantially as and for the purpose set forth.

In testimony that I claim the foregoing I have hereunto set my hand this 3d day of July, 1883.

PHILIP G. RUSSELL.

Witnesses:
J. T. COLDWELL,
W. D. GREEN.